(12) United States Patent
Lane

(10) Patent No.: US 6,627,024 B2
(45) Date of Patent: Sep. 30, 2003

(54) METHOD AND APPARATUS FOR SPLICING FIBROUS MATS

(75) Inventor: Adrian C. Lane, Alexandria, PA (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 116 days.

(21) Appl. No.: 10/041,920

(22) Filed: Jan. 7, 2002

(65) Prior Publication Data

US 2003/0127177 A1 Jul. 10, 2003

(51) Int. Cl.[7] .............................................. B32B 31/00
(52) U.S. Cl. .......................... 156/157; 156/159; 428/58; 428/60
(58) Field of Search ................ 156/157, 159; 428/58, 60

(56) References Cited

U.S. PATENT DOCUMENTS

| | | | |
|---|---|---|---|
| 3,101,290 A | * | 8/1963 | Paul .......................... 156/137 |
| 3,449,186 A | | 6/1969 | Rano |
| 3,661,669 A | | 5/1972 | Cairns |
| 3,770,555 A | | 11/1973 | Gladstone et al. |
| 3,872,629 A | | 3/1975 | Malloy |
| 3,885,071 A | | 5/1975 | Blad et al. |
| 4,027,435 A | | 6/1977 | Malloy |
| 4,144,219 A | | 3/1979 | Malloy |
| 4,194,618 A | | 3/1980 | Malloy |
| 4,366,014 A | | 12/1982 | Pollard |
| 4,416,027 A | | 11/1983 | Perla |
| 4,435,457 A | * | 3/1984 | Servo et al. ................... 428/58 |
| 4,496,412 A | * | 1/1985 | Ritter .......................... 156/157 |
| 4,584,040 A | | 4/1986 | Anderson |
| 4,767,653 A | | 8/1988 | Renstrom |
| 4,767,658 A | | 8/1988 | Lorenz |
| 4,910,059 A | | 3/1990 | Sancaktar |
| 5,104,475 A | | 4/1992 | Foster et al. |
| 5,219,629 A | | 6/1993 | Sobolev |
| 5,320,698 A | * | 6/1994 | Fournier et al. ............. 156/159 |
| 5,329,094 A | | 7/1994 | Murphy et al. |
| 5,486,249 A | | 1/1996 | Valaitis et al. |
| 5,523,139 A | * | 6/1996 | Morrison et al. .............. 428/57 |
| 5,584,897 A | | 12/1996 | Christianson et al. |
| 5,618,377 A | | 4/1997 | Kaneko et al. |
| 2002/0074078 A1 | * | 6/2002 | Van Heck .................... 156/159 |

* cited by examiner

*Primary Examiner*—Mark A. Osele
(74) *Attorney, Agent, or Firm*—Inger H. Eckert; Stephen W. Barns; Maria C. Gasaway

(57) ABSTRACT

A method for splicing fibrous mats including separating an edge of one fibrous mat into two sections, inserting an adhesive-containing edge of another fibrous mat between the two sections and applying heat to the adhesive-containing edge. Upon cooling, both of the mats are bonded together, forming a seam, completing the splice.

22 Claims, 3 Drawing Sheets

METHOD AND APPARATUS FOR SPLICING FIBROUS MATS

TECHNICAL FIELD

The present invention relates to a method and apparatus for splicing fibrous mats using heat. More particularly, it relates to a method and apparatus for splicing fibrous mats using a hand-held heating unit to apply heat to the edges of two mats, one or more of which, contain a heat-sensitive adhesive.

BACKGROUND

The concept of using heat and adhesivess to splice materials is well known. For instance, U.S. Pat. No. 3,449,186 describes a method of splicing plastic coated web material. This process is typically used when packaging articles. A web material is coated with plastic on one side is provided. Two edges of a plastic coated web material are cut forming tearing notches. The plastic coated side of one edge overlaps tearing notches (uncoated) of the other edge and heat is applied to the overlapped edges. With the application of heat, the plastic melts, forming a splice.

U.S. Pat. No. 3,770,555 illustrates an adhesive used for joining materials having a low resistance to heat, i.e., a coated abrasive belt. The free ends of the belt are overlapped and then joined together by a polyurethane, heat-activatable, adhesive film. The preformed adhesive permits joint formation under pressure, at low temperatures, making it possible to join materials which would otherwise cease to join because of their lack of heat resistance.

U.S. Pat. No. 3,661,669 describes a method of joining two strips of material each having a layer of resilient polymeric foam adhered to at least one surface, i.e., carpeting. The edges to be joined are compressed and a tape is bonded to the two strips of compressed foam. A strip of polymeric foam is then inserted into the recessed portion formed by the compressed strips.

U.S. Pat. No. 4,366,014 describes a method for forming joints between the ends of belting, i.e., continuous drive belts. A heating apparatus applies heat and pressure to two adjacent ends of belting causing the two ends to melt. The two melted ends are urged together to form a joint.

U.S. Pat. No. 4,584,040 illustrates a carpet seaming apparatus used to join abutting carpet seams. The seam-bonding apparatus contains a non-stick, heat reflective material and includes an adhesive tape guide and heating iron attachment point at one end. The apparatus and the iron are pulled along a carpet two abutting carpet seams, as a unit. The melted adhesive adheres to the carpet backing so that the carpet seams are joined.

U.S. Pat. No. 4,767,653 describes a heat-sealable rubbery sheet material made of low-density polyethylene film that is water-tight and resistant to temperature extremes. Further, a method for splicing two sheets together is described. Along the edge of one sheet is a thin layer of heat-sealable adhesive. The sheet containing the adhesive is placed on top of an adjacent sheet of material so that the edge of the adhesive sheet overlaps the adjacent sheet. Heat is then applied to the so that bonding to the sheets occurs.

U.S. Pat. No. 5,104,475 discloses a method for seaming for carpets that are installed by gluing pieces of carpet directly to a substrate. After the carpet pieces have been glued down, a carpet seaming tape is applied along the abutting seams of carpet. Adhesive is then applied to the seams and an electric seaming iron is moved along the length of the carpet seaming tape to melt the adhesive. The abutting carpet pieces are then pressed into the adhesive.

U.S. Pat. No. 5,329,094 illustrates a method and apparatus for performing splices in resilient plastic waterstops (used to provide a seal between slabs of concrete). The splicing apparatus includes a pair of radiant heating elements which are mounted horizontally to one another. A splice is made by positioning the juxtaposed ends of adjoining waterstop sections in the heated regions along the sides of the heating apparatus until the ends of the waterstop have softened. After softening the ends, they are joined together and cooled to form a welded seam.

U.S. Pat. No. 5,584,897 describes a method for making a coated abrasive belt by splicing two free ends of a polymeric or cloth backing sheet and then applying fibrous reinforcing material, a binder precursor and then an abrasive coating comprising binder and abrasive particles. The splice used is either a "lap splice" or a "butt splice". In a "lap splice", two free ends of the backing sheet are beveled in a tapered manner so that the top end and bottom end of the sheet can be fit together to form a joint without causing a change in the thickness of the belt. In a "butt splice", two free ends of the backing sheet are brought into juxtaposed relationship with the faces of the ends in confronting abutment so that they can be joined by adhesives, tape, or staples.

U.S. Pat. No. 5,486,249 illustrates a thermoplastic film for heat seaming roof sheeting. A thermoplastic film is interposed between the overlapped edges of two layers of roof sheeting material to form a seam. The overlapped area is heating to a temperature sufficient to melt the film, bonding the two layers of sheeting at the seam.

More recently, U.S. Pat. No. 5,618,377 discloses an apparatus and method for continuously splicing a thermally-shrinkable film, i.e., polyethylene film used for packaging. An edge portion of a first film, fed from a first roll, and an edge portion of a second film, fed from a second roll, are clamped by clamps on the splicing apparatus. At the desired splicing location a heater, advances and heat-seals the ends of the films so that they are connected.

All of the above patents teach methods and apparatus for splicing materials such as polyethylene films, rubbers, and various other plastics by overlapping one edge of the material over the other. None of the prior art specifically addresses splicing fibrous mats. In the past, fibrous mats were spliced by sewing the ends of two fibrous mats together.

Currently, splicing of the trailing edge of one fibrous mat to the leading edge of another fibrous mat is to sew the two mats together. This is done by splitting the trailing edge into two equal strips about 6 inches long. The leading edge of the new mat is then sandwiched between the two halves of the trailing mat and a sewing thread (glass or polyester) is used hold them together using a straight stitch. In some cases, to reduce the overall thickness of the splice, part of either or both mats is cut off. For example, the leading edge of the new mat is split into two equal parts and then cut off of one of the two split sections before inserting this mat into the split created in the trailing mat.

The sewing of two fibrous mats together has a major disadvantage in that the splice can be easily identified in the finished part, especially the sewing thread. Pultruded parts requiring a smooth unblemished surface must be scraped to remove the spliced section, causing a great deal of waste.

Fibrous mats are normally used as reinforcement in manufacturing composite materials in general. The major application for this splicing solution is the pultrusion process where a continuous cross-sectional profile is desired. The advantage to splicing with a polyamide tape is that it does not show in the surface of the finished part and does not affect the finished part strength. The most common resin for pultrusion is a thermoset. As heat in the die starts to weaken the splice made with polyamide tape the thermoset resin has begun to harden locking the splice in the finished part.

Thus, there is a need for a method to splice fibrous mats to create a strong joint between two mats and also to provide an aesthetically appealing product.

SUMMARY

The present invention relates to a method and apparatus for splicing fibrous mats. More particularly the invention relates to separating an edge of one fibrous mat into two sections, inserting an adhesive-containing edge of another fibrous mat between the two sections and applying heat to the adhesive-containing edge. Upon cooling, both of the mats are bonded together and the splice is complete.

Heating the mats can be carried by any conventional heating unit, however, the preferred heating unit is a hand-held device containing two adjacent heating elements affixed to a handle. The heating elements "clamp" the area where the mats are to be joined and evenly distribute heat so that the adhesive melts and the edges of the mats are securely bonded together.

It is an object of the present invention to provide a method of splicing fibrous mats which results in a strong bond between two fibrous mats after the splice is made.

It is an object of the present invention to provide a method of splicing fibrous mats resulting in a visually appealing final product.

It is another object of the present invention to provide a hand-held heating apparatus that can splice splicing fibrous in a timely manner.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
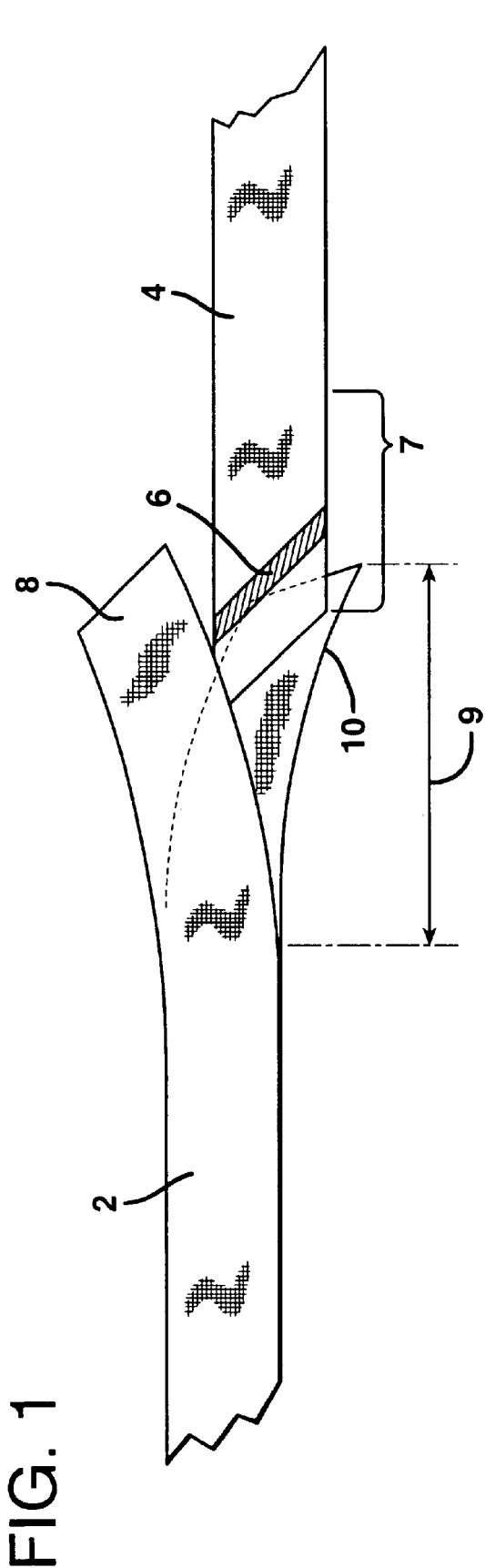
FIG. 1 is a perspective view of the two fibrous mats in position prior to splicing of the present invention.

In describing preferred embodiments of the invention, which are illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although preferred embodiments of the invention are herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF INVENTION

The above objects have been achieved through the development of a method to splice fibrous mats using heat. The fibrous mats of the present invention may be any that is suitable for use in the manufacture pultruded parts. The fibrous mat may be constructed of any fibrous material consisting of randomly oriented chopped filaments, short fibers, or swirled filaments held together with a binder. Typical mats used in pultrusion processes are constructed of sized glass fibers, a coupling agent and a binder. The fibrous mat can be formed by a variety of processes, including air-laid and wet-laid processes. A suitable fibrous mat for use in the present invention is disclosed in PCT International Publication Number PCT/US95/06744 which is hereby incorporated by reference. Other suitable fibrous mats include the following: OWENS CORNING products such as M8643, M8610, M8630, M8660, M8636, CD185, XDDBM3205, XDDB400, XDDB4008, and stitched mats such as NM0110, NM0115, NM0120 produced in Huntingdon, Pa. and Battice, Belgium, and Guelph, Ontario; VETROTEX products such as U528, U509, U813, U816, U850, U750, T700 and T800 series and S700 series, all produced in Besana, Italy; HOLLINEE (NICOFIBERS) products such as N751, N720, N764, and N720W and in general all N700 series produced in East Kilbride, Scotland and Shawnee, Okla.; SUPERIOR FIBERGLASS products such as 941, 910 (all 900 series) produced in Brenan, Ohio.; ASAHI products such as 8624, 8609 produced in Ibaraki, Japan.

Preferably, the fibrous mat is used to form a pultruded product through a conventional pultrusion process. Typically, one or more layers of roving, one or more layers of a veil, and a resin are used in forming a pultruded product. Layers or roving provide the pultruded product with strength and structural support. Rovings may be made from glass, graphite, boron or polyaramid fibers. Veil layers are used to provide an exterior layer which encases the glass fiber mats. Each veil layer comprises a fabric formed from glass or a thermoplastic material, such as polyester.

Fibrous mats are available in blankets of various widths, weights and lengths and are manufactured by various processes known in the art including, but not limited to, wet-forming, and dry-forming processes.

A preferred embodiment of the present invention is shown in FIG. 1. Fibrous mat 2 is separated at the trailing edge 9 into two even layers, 8, 10. The mat may be separated by hand or by mechanical means, i.e., a motorized clamping means. The length of separation of the layers 8, 10 of fibrous mat 2 may be any length sufficient to contain the leading edge 7 of fibrous mat 4, preferably this length is typically between about 4 to about 8 inches and most preferably about 6 inches.

Figure 2:
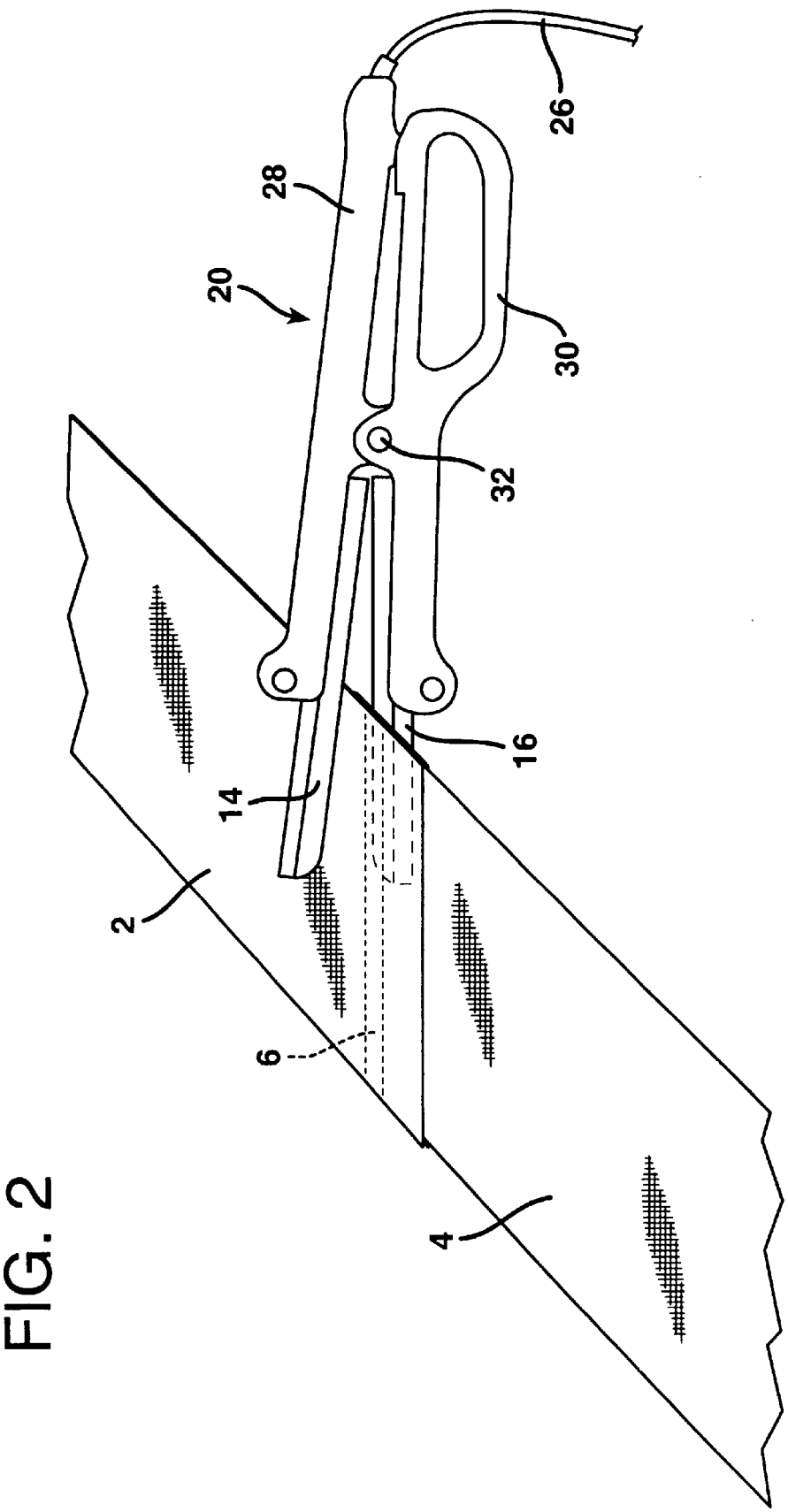
FIG. 2 is a perspective view of the hand-held heating unit in position of the present invention.
Figure 4:
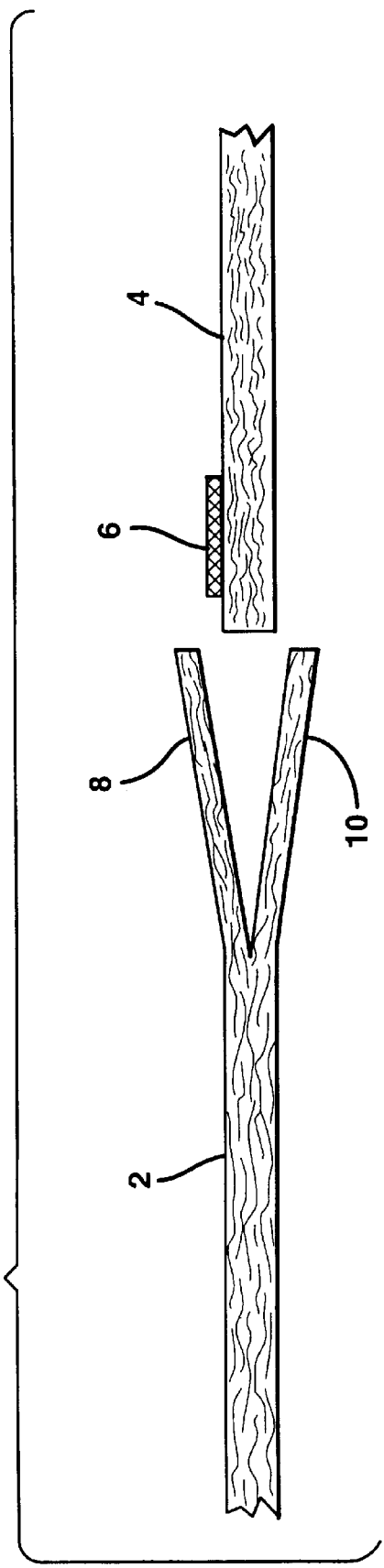
FIG. 4 is side view of the two fibrous mats prior to being spliced.

As shown in FIGS. 1 and 4, the leading edge 7 of fibrous mat 4 includes an adhesive 6. The leading edge 7 of fibrous mat 4, containing the adhesive 6, is inserted between the layers 8, 10 of the trailing edge 9 of fibrous mat 2. The adhesive may be any heat-sensitive adhesive which, when heated, melts and bonds the leading edge 7 of fibrous mat 4 between the layers 8, 10 of the trailing edge 9 of fibrous mat 2. Preferably, a 100% polyamide heat-sensitive material, produced as a fabric or tapes, is used as the adhesive. Some preferable adhesives include TRANS-WEB produced by Handler Textile Corporation in Moonachie, N.J. and STICK WITCHERY produced by the Prym-Dritz Corporation in Spartanburg, S.C. The adhesive may be affixed on one, or both, sides of the leading edge 7 of the mat 4. Alternatively, the adhesive may be affixed to one or both layers 8, 10 of the trailing edge 9 of the fibrous mat 2 on the sides of the layer(s) where the leading edge 7 of the fibrous mat 4 is received (not shown). Preferably, as shown in FIG. 2, the adhesive is applied as a strip along a portion of the length of the leading edge 7 of the mat 4. However, the adhesive may be applied over the entire leading edge or in various areas on the leading edge, i.e., in a pattern. This method of adhesive application can apply to the trailing edges as well (discussed above).

Figure 5:
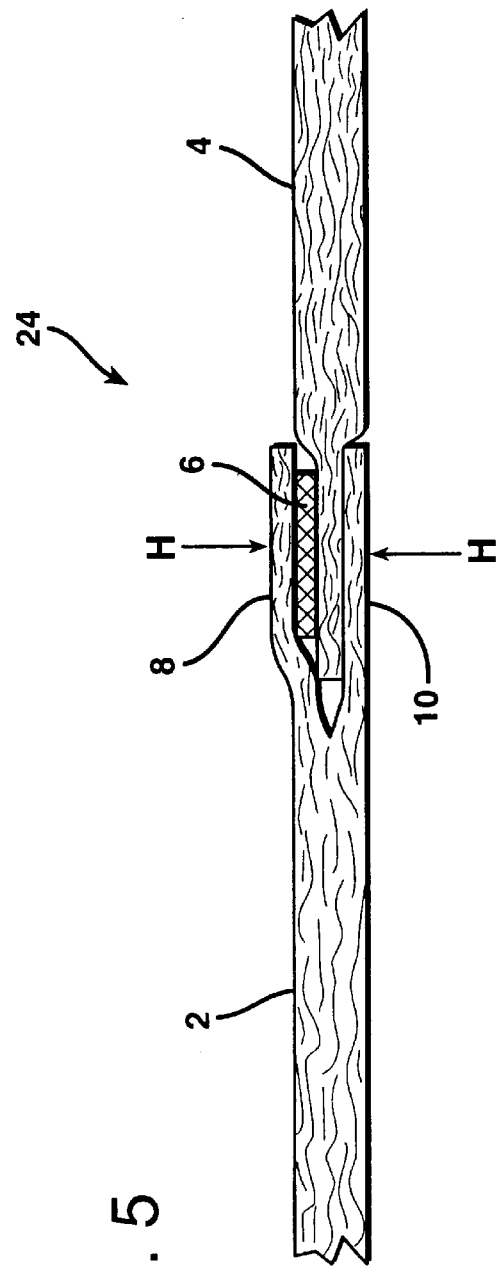
FIG. 5 is a side view of the two fibrous mats after being spliced.

After insertion of the leading edge 7 between the layers 8, 10, heat, designated by "H", is applied to the adhesive-containing, overlapped area 6, as shown in FIG. 5. As heat is applied, the mats are held together by a clamping means (not shown) or by the user's hands (not shown). Heat is applied using any conventional heating apparatus sufficient to melt the adhesive and splice the mats, including, but not limited to, an electrically heated rod, a heated air gun, or a heated iron.

A preferred heating apparatus is show in FIG. 2. Hand-held heating device 20 contains two heating elements 14 and 16. Heating elements 14 and 16 comprise a conventional heat conductive material and connect to and electrical source (not shown), via electrical cord 26, which heats them during the operation of the device. Heating element 14 is connected to upper rod 15 and heating element 16 is connected to lower rod 17. A hinge 32 attaches upper rod 15 to lower rod 17. Upper rod 15 contains a handle 28 and lower rod 17 contains a grip 30 which allows the operator to obtain a firm grasp on the device.

The hand-held heating device is operated by a user firmly grasping the grip 30 and the handle 28 so that the upper and lower rods, containing the heating elements, are in the "open position", see FIG. 2. Once the heating elements 14, 16 have been positioned over the adhesive-containing, overlapped area 6 of the mats, the user releases their grasp of the grip 30 and handle 28. Upon release, the heating elements 14, 16 contact both above and below the adhesive-containing, overlapped area 6 and melt the adhesive. At this point, the hand-held device in the "closed" position. The preferred temperature required to melt the adhesive and splice the mats using a hand-held device is between about 200 to about 900° F. and most preferably about 700° F. Heat is applied to the area for, preferably, about 7–15 seconds and most preferably, about 10 seconds.

Figure 3:
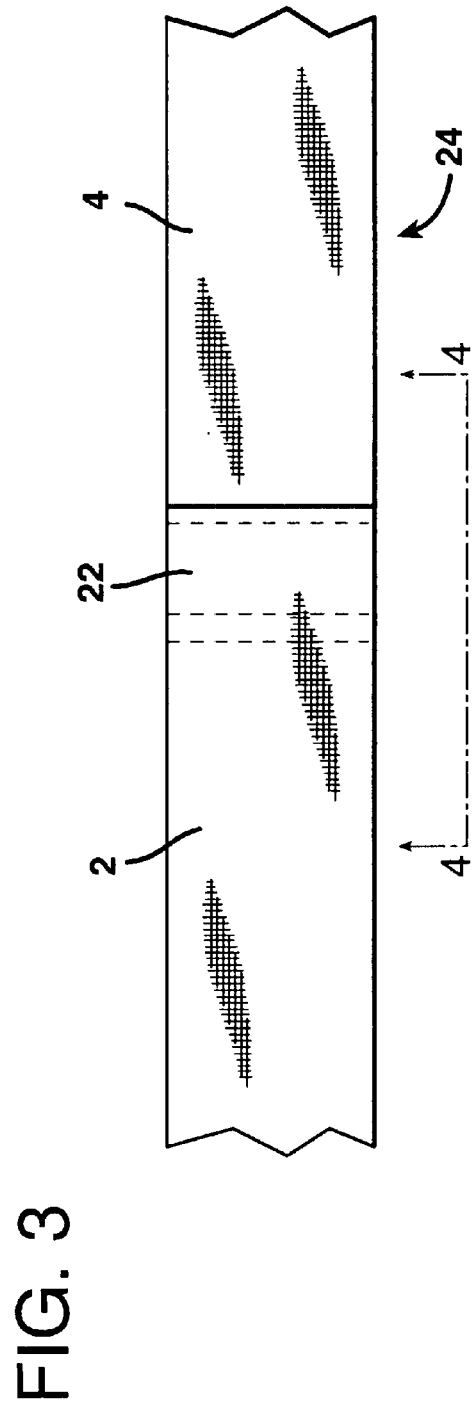
FIG. 3 is a top view of the two fibrous mats after being spliced.

As previously discussed, any suitable heating apparatus can be used to melt the adhesive. The heating apparatus can contain one or more heating elements and may be hand-held or automatic. An automatic heating apparatus may be employed where mats are spliced in a continuous manufacturing process. Heat can be applied to the mats on either one or both sides of the mats, so as long as the adhesive is effectively melted. After heating the mats, the user grasps the grip 30 and handle 28 so that the hand-held heating device is in the "open position" and the heating device is removed. After the mat cools, the splice is complete as depicted in FIG. 3 The melted adhesive, not visible in the finished product, is shown as spliced section 22.

It is possible that changes in configurations to other than those shown could be used but that which is shown is preferred and typical. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

What is claimed is:

1. A method for splicing fibrous mats including the steps of:

a) providing a first fibrous mat having a trailing edge;

b) separating said first fibrous mat at said trailing edge forming first and second layers;

c) providing a second fibrous mat having a leading edge with a width;

d) applying an adhesive along a leading edge portion of said width of said second fibrous mat;

e) inserting said leading edge portion of said second fibrous mat between said first and second layers of said trailing edge of said first fibrous mat forming an overlapping abutment;

f) applying heat to said overlapping abutment to form a splice.

2. The method of claim 1, wherein said adhesive is a 100% polyamide tape.

3. The method of claim 2, wherein said tape is heat sensitive.

4. The method of claim 1, wherein said step of applying heat is performed by a hand-held heating device.

5. The method of claim 1, wherein said heat is applied for about 6–15 seconds.

6. The method of claim 5, wherein said heat is applied for about 10 seconds.

7. The method of claim 1, wherein said first and second layers of said first fibrous mat are separated between about 4 to about 7 inches.

8. The method of claim 8, wherein said first and second layers of said first fibrous mat are separated about 6 inches.

9. The method of claim 1, wherein said fibrous mat is used in pultrusion processes.

10. The method of claim 1, wherein said heat is applied at a temperature between about 200° to about 900° F.

11. The method of claim 4, wherein said heat is applied at a temperature of about 700° F.

12. A method for splicing fibrous mats including the steps of:

a) providing a first fibrous mat having an edge;

b) providing a second fibrous mat having an edge;

c) separating one of said fibrous mats at said edge forming first and second layers while leaving the other fibrous mat unseparated;

d) applying an adhesive to at least one of said edges of said fibrous mats;

e) inserting said edge of said unseparated fibrous mat between said first and second layers forming an overlapping abutment; and f) applying heat to said overlapping abutment to form a splice.

13. The method of claim 12, wherein said adhesive is a 100% polyamide tape.

14. The method of claim 13, wherein said tape is heat sensitive.

15. The method of claim 12, wherein said step of applying heat is performed by a hand-held heating device.

16. The method of claim 12, wherein said heat is applied for about 6–15 seconds.

17. The method of claim 16, wherein said heat is applied for about 10 seconds.

18. The method of claim 12, wherein said first and second layers of said fibrous mat are separated between about 4 to about 7 inches.

19. The method of claim 18, wherein said first and second layers of said fibrous mat are separated about 6 inches.

20. The method of claim 12, wherein said fibrous mat is used in pultrusion processes.

21. The method of claim 12, wherein said heat is applied at a temperature between about 200° to 900° F.

22. The method of claim 15, wherein said heat is applied at a temperature of about 700°.

* * * * *